US012686791B2

(12) United States Patent
Maekawa et al.

(10) Patent No.: US 12,686,791 B2
(45) Date of Patent: Jul. 21, 2026

(54) ADDITION CURABLE LIQUID SILICONE RUBBER COMPOSITION FOR FLAME RETARDANT AIRBAG

(71) Applicant: SHIN-ETSU CHEMICAL CO., LTD., Tokyo (JP)

(72) Inventors: Juri Maekawa, Shinagawa-ku (JP); Ryo Ashida, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 396 days.

(21) Appl. No.: 18/032,380

(22) PCT Filed: Sep. 13, 2021

(86) PCT No.: PCT/JP2021/033446
§ 371 (c)(1),
(2) Date: Apr. 18, 2023

(87) PCT Pub. No.: WO2022/091601
PCT Pub. Date: May 5, 2022

(65) Prior Publication Data

US 2023/0399541 A1 Dec. 14, 2023

(30) Foreign Application Priority Data

Oct. 29, 2020 (JP) ................................ 2020-181327

(51) Int. Cl.

| | |
|---|---|
| ***B60R 21/235*** | (2006.01) |
| ***B32B 25/20*** | (2006.01) |
| ***C08K 3/22*** | (2006.01) |
| ***C09D 7/61*** | (2018.01) |
| ***C09D 7/63*** | (2018.01) |
| ***C09D 183/04*** | (2006.01) |
| ***D06N 3/00*** | (2006.01) |
| ***D06N 3/12*** | (2006.01) |

(52) U.S. Cl.
CPC ............ *C09D 183/04* (2013.01); *B32B 25/20* (2013.01); *B60R 21/235* (2013.01); *C09D 7/61* (2018.01); *C09D 7/63* (2018.01); *D06N 3/0006* (2013.01); *D06N 3/128* (2013.01); *B60R 2021/23514* (2013.01); *C08K 2003/2272* (2013.01); *D06N 2203/066* (2013.01); *D06N 2209/067* (2013.01)

(58) Field of Classification Search
CPC . C09D 183/04; C08L 83/04–08; C08L 83/00; C08K 2003/2265; C08K 2003/2272; C08K 5/56; C08K 3/36; C08K 3/22; C08K 5/5435
See application file for complete search history.

(56) References Cited

U.S. PATENT DOCUMENTS

| | | | | |
|---|---|---|---|---|
| 4,246,313 A | | 1/1981 | Stengle, Jr. | |
| 4,257,932 A | | 3/1981 | Beers | |
| 4,461,867 A | | 7/1984 | Surprenant | |
| 4,525,400 A | | 6/1985 | Surprenant | |
| 5,529,837 A | | 6/1996 | Fujiki et al. | |
| 6,075,110 A | * | 6/2000 | Mohri | C09D 133/06 528/21 |
| 6,425,600 B1 | * | 7/2002 | Fujiki | D06N 3/128 524/588 |
| 2005/0037207 A1 | * | 2/2005 | Komiyama | C09D 171/02 523/400 |
| 2011/0076479 A1 | | 3/2011 | Danielson et al. | |
| 2018/0013057 A1 | * | 1/2018 | Arizumi | B32B 5/022 |
| 2019/0092969 A1 | | 3/2019 | Akitomo et al. | |
| 2020/0070764 A1 | | 3/2020 | Ashida et al. | |

FOREIGN PATENT DOCUMENTS

| | | | | | |
|---|---|---|---|---|---|
| CN | 107001800 A | | 8/2017 | |
| CN | 110402309 A | | 11/2019 | |
| EP | 3 219 762 A1 | | 9/2017 | |
| JP | H07-070923 A | | 3/1995 | |
| JP | 07300774 A | * | 11/1995 | B60R 21/235 |
| JP | H07-300774 A | | 11/1995 | |
| JP | 2001-348481 A | | 12/2001 | |
| JP | 2002-220532 A | | 8/2002 | |
| JP | 2002-371475 A | | 12/2002 | |
| JP | 2011-523911 A | | 8/2011 | |
| JP | 2013-209517 A | | 10/2013 | |
| JP | 2018-080421 A | | 5/2018 | |

(Continued)

OTHER PUBLICATIONS https://www.ulprospector.com/en/na/Coatings/Detail/22631/572366/Toda-Color-100EDS, accessed online May 31, 2025 (Year: 2025).*
Translated CN Second Office Action issued Dec. 9, 2025 for CN App. No. 202180072492.3 (Chinese counterpart application of U.S. Appl. No. 18/032,380) (Year: 2025).*
Nov. 28, 2023 Office Action issued in Japanese Patent Application No. 2020-181327.
Oct. 26, 2021 International Search Report issued in International Patent Application No. PCT/JP2021/033446.
May 2, 2023 International Preliminary Report on Patentability issued in International Patent Application No. PCT/JP2021/033446.
Sep. 9, 2024 Extended Search Report issued in European Patent Application No. 21885720.9.

(Continued)

*Primary Examiner* — Michael C. Romanowski
(74) *Attorney, Agent, or Firm* — Oliff PLC

(57) ABSTRACT

An addition curable liquid silicone rubber composition for airbag includes an organopolysiloxane which is liquid at 25° C. and contains two or more alkenyl groups bonded to silicon atoms within one molecule, an organohydrogenpolysiloxane containing two or more hydrogen atoms bonded to silicon atoms within one molecule, a silica fine powder having a BET specific surface area of 50 $m^2/g$ or more, a catalyst for hydrosilylation reaction, an organosilicon compound containing an adhesion-imparting functional group, an organopolysiloxane resin having a three-dimensional network structure, and iron(III) oxide monohydrate, α-iron (II) oxide, or both of them having a pH of 5 to 9.

4 Claims, No Drawings

(56) References Cited

FOREIGN PATENT DOCUMENTS

| | | | | | |
|---|---|---|---|---|---|
| JP | 2019-513907 | A | | 5/2019 | |
| WO | WO-2018168315 | A1 | * | 9/2018 | B01J 31/12 |

OTHER PUBLICATIONS

May 19, 2025 Search Report issued in Chinese Patent Application No. 202180072492.3.

Lai Liang-qing, et al.; "Effect of Heat-resistant Additive on Flammability of Silicone Rubber" Journal of Aeronautical Materials, vol. 31, No. 5, pp. 66-70, Oct. 1, 2011.

Dec. 9, 2025 Office Action and Search Report issued in Chinese Patent Application No. 202180072492.3.

Feb. 4, 2026 Office Action issued in Korean Patent Application No. 2023-7012929.

Apr. 20, 2026 Search Report issued in Chinese Patent Application No. 202180072492.3.

* cited by examiner

ADDITION CURABLE LIQUID SILICONE RUBBER COMPOSITION FOR FLAME RETARDANT AIRBAG

TECHNICAL FIELD

The present invention relates to an addition curable liquid silicone rubber composition for flame retardant airbags which is suitable for producing airbags.

BACKGROUND ART

Conventionally, a silicone rubber composition for airbag has been proposed for the purpose of forming a rubber coating on a fiber surface. An airbag having a silicone rubber coating has excellent low burning rate property (flame retardancy), and thus is suitably used as an airbag for vehicles and the like.

As a method for evaluating the flame retardancy of airbags, the method of evaluating low burning rate property specified in FMVSS (Federal Motor Vehicle Safety Standards) No. 302 is known. This evaluation method differs greatly from UL94, which evaluates the flame retardancy of general silicone rubber. Therefore, there are not a few cases that rubber is not eligible for use in airbags when the low burning rate property is evaluated, even if the general flame retardancy evaluation of the rubber is preferable.

Examples of such a silicone coating composition for airbag that have been disclosed include an airbag the fiber surface of which is coated with a liquid silicone composition that contains a resin-like polysiloxane and is produced by mixing siloxane components with silica, a surface treating agent, and water in advance (Patent Document 1), and an addition curable liquid silicone rubber composition that is produced by using an organohydrogenpolysiloxane containing a T unit or Q unit as a crosslinking agent and has excellent strength of a coating base cloth (Patent Document 2).

However, the coating base cloth for airbag produced by coating a conventional addition curable liquid silicone rubber composition onto a base cloth for airbag and curing the composition could not satisfy the low burning rate property required as a base cloth for airbag in a recently required low coating amount.

Moreover, the addition curable liquid silicone rubber composition having excellent adhesiveness, mechanical property, and sustainability produced by adding silicate mineral fine powder such as talc, kaolinite, and kaolin (Patent Document 3); and the airbag produced by adding fine powdery manganese carbonate or zinc carbonate to obtain excellent flame retardancy (Patent Document 4).

However, when silicate mineral fine powder or powder such as manganese carbonate or zinc carbonate is blended, the process becomes complicated, and the possibility is suggested that the mechanical strength is impaired.

CITATION LIST

Patent Literature

Patent Document 1: JP 2013-209517 A
Patent Document 2: JP 2019-513907 A
Patent Document 3: JP 2018-080421 A
Patent Document 4: JP H07-070923 A

SUMMARY OF INVENTION

Technical Problem

The present invention was made in view of the above circumstances, and has for its object to provide an airbag and an addition curable liquid silicone rubber composition for airbag having excellent low burning rate property and self-extinguishing property as specified in FMVSS (Federal Motor Vehicle Safety Standards) No. 302.

Solution to Problem

For solving the above problems, the present invention provides an addition curable liquid silicone rubber composition for airbag including:

(A) 100 parts by mass of an organopolysiloxane which is liquid at 25° C. and contains two or more alkenyl groups bonded to silicon atoms within one molecule, (B) an organohydrogenpolysiloxane containing two or more hydrogen atoms bonded to silicon atoms within one molecule in such an amount that a hydrosilyl group contained in a composition is 1 to 10 moles per 1 mole of the total alkenyl groups bonded to silicon atoms contained in the composition, (C) 1 to 50 parts by mass of a silica fine powder having a BET specific surface area of 50 $m^2/g$ or more, (D) a catalytic amount of a catalyst for hydrosilylation reaction, (E) 0.1 to 10 parts by mass of an organosilicon compound containing an adhesion-imparting functional group, (F) 0.1 to 100 parts by mass of an organopolysiloxane resin having a three-dimensional network structure, and (G) 1 to 50 parts by mass of iron(III) oxide monohydrate and/or α-iron(III) oxide having a pH of 5 to 9.

With such an addition curable liquid silicone rubber composition for airbag, it is possible to obtain an airbag having excellent low burning rate property and self-extinguishing property as specified in FMVSS No. 302.

The adhesion-imparting functional group of the component (E) is preferably one or more groups selected from an epoxy group, an alkoxy group bonded to a silicon atom, an alkenyl group, a hydrosilyl group, an isocyanate group, a (meth)acryl group, and a (meth)acryloxy group.

With such an addition curable liquid silicone rubber composition for airbag, adhesion of the silicone rubber composition to a base cloth for airbag can be exhibited and improved.

Furthermore, the composition preferably contains, as a component (H), 0.1 to 5 parts by mass of at least one condensation cocatalyst selected from an organotitanium compound, an organozirconium compound, and an organoaluminum compound relative to 100 parts by mass of the component (A).

With such an addition curable liquid silicone rubber composition for airbag, the adhesion can be promoted.

In addition, the present invention provides an airbag having a cured film of the above addition curable liquid silicone rubber composition for airbag on a base cloth for airbag.

Such an airbag has excellent low burning rate property and self-extinguishing property as specified in FMVSS No. 302.

Advantageous Effects of Invention

According to the present invention, a flame retardant airbag having excellent low burning rate property and self-extinguishing property as specified in FMVSS No. 302 can be obtained.

DESCRIPTION OF EMBODIMENTS

As described above, development of an airbag and an addition curable liquid silicone rubber composition for airbag having excellent low burning rate property and self-extinguishing property as specified in FMVSS No. 302 have been demanded.

The present inventors have made intensive investigations to achieve the above object, and as a result, they found that the silicone-coated base cloth for producing an airbag obtained by coating an addition curable liquid silicone rubber composition containing the below-mentioned components (A) to (G) as essential components on the surface of a base cloth for airbag, and heating and curing the composition has superior flame retardancy and self-extinguishing property. Thereby, the present invention was completed.

That is, the present invention is an addition curable liquid silicone rubber composition for airbag including:

(A) 100 parts by mass of an organopolysiloxane which is liquid at 25° C. and contains two or more alkenyl groups bonded to silicon atoms within one molecule, (B) an organohydrogenpolysiloxane containing two or more hydrogen atoms bonded to silicon atoms within one molecule in such an amount that a hydrosilyl group contained in a composition is 1 to 10 moles per 1 mole of the total alkenyl groups bonded to silicon atoms contained in the composition, (C) 1 to 50 parts by mass of a silica fine powder having a BET specific surface area of 50 $m^2/g$ or more, (D) a catalytic amount of a catalyst for hydrosilylation reaction, (E) 0.1 to 10 parts by mass of an organosilicon compound containing an adhesion-imparting functional group, (F) 0.1 to 100 parts by mass of an organopolysiloxane resin having a three-dimensional network structure, and (G) 1 to 50 parts by mass of iron(III) oxide monohydrate and/or α-iron(III) oxide having a pH of 5 to 9.

Hereinafter, the present invention will be described in detail. However, the present invention is not limited thereto. In the specification, a viscosity is a value measured at 25° C. using a rotary viscometer by the method described in JIS K 7117-1:1999.

Addition Curable Liquid Silicone Rubber Composition

The addition curable liquid silicone rubber composition for airbag of the present invention contains the following components (A) to (G), and is liquid at room temperature (25° C.). Hereinafter, each component is described in detail.

Component (A)

The component (A) is an organopolysiloxane which is liquid at 25° C. and contains two or more alkenyl groups bonded to silicon atoms within one molecule, and is a base polymer (main agent) of the composition according to the present invention. When the component (A) is a mixture of two or more components, the mixture may be liquid at 25° C.

The molecular structure of the component (A) is not particularly limited, and examples thereof include linear, cyclic, and branched structures. Preferred is a linear diorganopolysiloxane with both molecular chain ends blocked with triorganosiloxy groups having the main chain basically composed of repeated diorganopolysiloxane units. Further, when the molecular structure of organopolysiloxane of the component (A) is linear or branched, the position of the silicon atoms to which alkenyl groups are bonded in the molecule of the organopolysiloxane may be either one or both of the molecular ends (that is, a triorganosiloxy group) or in the middle of the molecular chain (that is, a bifunctional diorganosiloxane unit or trifunctional monoorganosilsesquioxane unit positioned at molecular chain non-terminal). As the component (A), particularly preferred is a linear diorganopolysiloxane at least containing alkenyl groups bonded to silicon atoms at both ends of the molecular chain.

The alkenyl group bonded to a silicon atom in the component (A) is not particularly limited, and examples thereof include those having generally 2 to 8, preferably 2 to 4 carbon atoms. Specific examples thereof include a vinyl group, an allyl group, a propenyl group, a butenyl group, a pentenyl group, a hexenyl group, a cyclohexenyl group, and a heptenyl group. Particularly preferred is a vinyl group.

The content of the alkenyl group bonded to a silicon atom in the component (A) is preferably 0.001 to 10 mole %, and particularly preferably about 0.01 to 5 mole % relative to the total monovalent organic groups bonded to silicon atoms (that is, unsubstituted or substituted monovalent hydrocarbon groups).

The monovalent organic group bonded to a silicon atom other than the alkenyl group of the component (A) is not particularly limited, and examples thereof include same or different, unsubstituted or substituted monovalent hydrocarbon groups having generally 1 to 12, preferably 1 to 10 carbon atoms. Specific examples of the monovalent organic group include an alkyl group such as a methyl group, an ethyl group, a propyl group, a butyl group, a pentyl group, a hexyl group, a cyclohexyl group, and a heptyl group; an aryl group such as a phenyl group, a tolyl group, a xylyl group, and a naphthyl group; an aralkyl group such as a benzyl group and a phenethyl group; a halogen-substituted alky group such as a chloromethyl group, a 3-chloropropyl group, and a 3,3,3-trifluoropropyl group. In particular, a methyl group is preferable.

The polymerization degree (weight average polymerization degree) of the component (A) is preferably 50 to 2,000, and more preferably 100 to 1,500. When the polymerization degree is 50 or more, the obtained silicone rubber composition has preferable mechanical properties. Further, when the polymerization degree is 2,000 or less, the viscosity of the obtained silicone rubber composition can be suppressed to result in good coating workability, and thus is preferable. Note that when the component (A) is a mixture containing a plurality of components, the sum of the product of polymerization degree and the mass fraction of each component is regarded as the polymerization degree of the component (A).

"The polymerization degree" as used herein is obtained by the weight average molecular weight measured by a gel permeation chromatography (GPC) under the following conditions using polystyrene as a standard substance (the same shall apply hereinafter).

Measurement Conditions

Developing solvent: toluene

Flow rate: 1 mL/min

Detector: differential refractive index detector (RI)

Column: KF-805L×2 columns (manufactured by Shodex Co., Ltd.)

Column temperature: 25° C.

Sample injection amount: 20 μL (a toluene solution having a concentration of 0.1 mass %)

Specific examples of the organopolysiloxane of the component (A) include a dimethyl siloxane/methyl vinyl siloxane copolymer with both molecular chain ends blocked with trimethylsiloxy groups, methyl vinyl polysiloxane with both molecular chain ends blocked with trimethylsiloxy groups, a dimethyl siloxane/methyl vinyl siloxane/methyl phenyl siloxane copolymer with both molecular chain ends blocked with trimethylsiloxy groups, dimethylpolysiloxane with both molecular chain ends blocked with dimethyl vinyl siloxy groups, methyl vinyl polysiloxane with both molecular chain ends blocked with dimethyl vinyl siloxy groups, a dimethyl siloxane/methyl vinyl siloxane copolymer with both molecular chain ends blocked with dimethyl vinyl siloxy groups, a dimethyl siloxane/methyl vinyl siloxane/methyl phenyl siloxane copolymer with both molecular chain ends blocked with dimethyl vinyl siloxy groups, dimethyl polysiloxane with both molecular chain ends blocked with divinyl methyl siloxy groups, a dimethyl siloxane/methyl vinyl siloxane copolymer with both molecular chain ends blocked with divinyl methyl siloxy groups, dimethyl polysiloxane with both molecular chain ends blocked with trivinylsiloxy groups, a dimethyl siloxane/methyl vinyl siloxane copolymer with both molecular chain ends blocked with trivinylsiloxy groups, and a mixture composed of two or more of these organopolysiloxanes.

The organopolysiloxane of the component (A) may be used alone, or two or more of them may be used in combination.

Component (B)

The organohydrogenpolysiloxane of the component (B) performs a hydrosilylation addition reaction mainly with alkenyl groups in the component (A) and acts as a cross-linking agent (curing agent).

The molecular structure of the component (B) is not particularly limited, and examples thereof include various structures such as linear, cyclic, branched, and three-dimensional network (resin-like). It is necessary to have at least two, preferably three or more hydrogen atoms bonded to silicon atoms (hydrosilyl groups) within one molecule, desirably 2 to 300 in general, preferably 3 to 200, more preferably 4 to 100 hydrosilyl groups are contained, and preferably liquid at 25° C. Such a hydrosilyl group may be positioned at either or both of the molecular chain end and in the middle of the molecular chain.

The organohydrogenpolysiloxane represented by the following average composition formula (1) may be used.

$$R^1_aH_bSiO_{(4-a-b)/2} \qquad (1)$$

In the formula (1), $R^1$ each represents the same or different, unsubstituted or substituted monovalent hydrocarbon group bonded to a silicon atom, excluding an aliphatic unsaturated bond such as an alkenyl group, preferably having 1 to 10 carbon atoms. Examples thereof include an alkyl group such as a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, and a decyl group; an aryl group such as a phenyl group, a tolyl group, a xylyl group, and a naphthyl group; an aralkyl group such as a benzyl group, a phenylethyl group, and a phenylpropyl group; and those obtained by substituting a part or all of hydrogen atoms in these groups with a halogen atom such as fluorine, bromine or chlorine, including a chloromethyl group, a chloropropyl group, a bromoethyl group, and a trifluoropropyl group. $R^1$ is preferably an alkyl group or an aryl group, and more preferably a methyl group. Preferably, "a" and "b" are positive numbers of 0.7 to 2.1 and 0.01 to 1.0, respectively, and "a+b" satisfies 0.8 to 3.0. More preferably, "a" and "b" are positive numbers of 1.0 to 2.0 and 0.01 to 1.0, respectively, and "a+b" satisfies 1.5 to 2.5.

Examples of such an organohydrogenpolysiloxane of the component (B) include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogen cyclopolysiloxane, a methylhydrogensiloxane/dimethylsiloxane cyclic copolymer, methylhydrogenpolysiloxane with both molecular chain ends blocked with trimethylsiloxy groups, a dimethylsiloxane/methylhydrogensiloxane copolymer with both molecular chain ends blocked with trimethylsiloxy groups, a dimethylsiloxane/methylhydrogensiloxane/methylphenylsiloxane copolymer with both molecular chain ends blocked with trimethylsiloxy groups, a dimethylsiloxane/methylhydrogensiloxane/diphenylsiloxane copolymer with both molecular chain ends blocked with trimethylsiloxy groups, methylhydrogenpolysiloxane with both molecular chain ends blocked with dimethylhydrogensiloxy groups, dimethylpolysiloxane with both molecular chain ends blocked with dimethylhydrogensiloxy groups, a dimethylsiloxane/methylhydrogensiloxane copolymer with both molecular chain ends blocked with dimethylhydrogensiloxy groups, a dimethylsiloxane/methylphenylsiloxane copolymer with both molecular chain ends blocked with dimethylhydrogensiloxy groups, a dimethylsiloxane/diphenylsiloxane copolymer with both molecular chain ends blocked with dimethylhydrogensiloxy groups, methylphenylpolysiloxane with both molecular chain ends blocked with dimethylhydrogensiloxy groups, diphenylpolysiloxane with both molecular chain ends blocked with dimethylhydrogensiloxy groups; those in which a part or all of methyl groups is substituted with other alkyl groups such as an ethyl group and a propyl group in the exemplified compounds; an organosiloxane copolymer composed of a siloxane unit represented by the formula: $R^2_3SiO_{1/2}$, a siloxane unit represented by the formula: $R^2_2HSiO_{1/2}$, and a siloxane unit represented by the formula: $SiO_{4/2}$; an organosiloxane copolymer composed of a siloxane unit represented by the formula: $R^2_2HSiO_{1/2}$ and a siloxane unit represented by the formula: $SiO_{4/2}$, and an organosiloxane copolymer composed of a siloxane unit represented by the formula: $R^2HSiO_{2/2}$ and a siloxane unit represented by the formula: $R^2SiO_{3/2}$ or a siloxane unit represented by the formula: $HSiO_{3/2}$; and a mixture composed of two or more of these organopolysiloxanes. $R^2$ in the above formula is a monovalent hydrocarbon group other than the alkenyl group.

The blending amount of the component (B) is such that a hydrosilyl group contained in the composition is 1 to 10 moles per 1 mole of the total alkenyl groups bonded to silicon atoms contained in the composition. For example, it is an amount such that the hydrosilyl group contained in the component (B) is 1 to 10 moles (or groups), preferably 1.2 to 9 moles (or groups), and more preferably 1.5 to 8 moles (or groups) relative to 1 mole (or group) of the total alkenyl groups bonded to silicon atoms contained in the component (A).

When the amount of the hydrosilyl group contained in the composition is less than 1 mole relative to 1 mole of the total alkenyl groups bonded to silicon atoms contained in the composition, the composition is not cured sufficiently, and when the amount exceeds 10 moles, the heat resistance of the obtained silicone rubber cured product may be extremely inferior.

The organohydrogenpolysiloxane of the component (B) may be used alone, or two or more of them may be used in combination.

Component (C)

The silica fine powder of the component (C) acts as a reinforcing filler. That is, it imparts the strength to the silicone rubber cured product obtained from the composition according to the present invention. By using the silica fine powder as a reinforcing filler, a coating film satisfying the strength required for airbag can be formed. Such silica fine powder needs to have the specific surface area (BET method) of 50 $m^2/g$ or more, preferably 50 to 400 $m^2/g$, and more preferably 100 to 300 $m^2/g$. If the specific surface area is less than 50 $m^2/g$, satisfactory strength properties cannot be imparted. Although a primary particle size of the silica fine powder is generally 1 to 100 nm, since coagulation force of the powder is high, it is difficult to measure a correct particle size (coagulated particle size).

Silica fine powder that has been conventionally used as a reinforcing filler of silicone rubber may be used provided that the specific surface area is within the above range. Examples thereof include aerosol silica (fumed silica) and precipitate silica (wet silica).

As the silica fine powder, for example, silica fine powder the surface of which has been subjected to hydrophobization treatment with a surface treatment agent such as (usually hydrolysable) organic silicon compounds including chlorosilane, alkoxysilane, and organosilazane. On that occasion, the silica fine powder may be directly subjected to surface-hydrophobization treatment by a surface treatment agent beforehand in a powder state, or may be added with a surface treatment agent in kneading with silicone oil (for example, the alkenyl group-containing organopolysiloxane of the component (A)) to be subjected to surface-hydrophobization treatment.

As a general treatment method of the component (C), a known technique may be used for the surface treatment. For example, the untreated silica fine powder and a surface treatment agent may be put into a kneading machine sealed at normal pressure or a fluidized bed, and mixed at room temperature (25° C.) or under heat treatment (heating) in the presence of inert gas as necessary. In some cases, water or a catalyst (hydrolysis accelerator, etc.) may be used to promote the surface treatment. By drying after kneading, surface-treated silica fine powder can be produced. The blending amount of the surface treatment agent may be an amount calculated from a coating area of the surface treatment agent or more.

Examples of the surface treatment agent include, specifically, silazanes such as hexamethyldisilazane; silane coupling agents such as methyltrimethoxysilane, ethyltrimethoxysilane, propyltrimethoxysilane, butyl trimethoxysilane, dimethyl dimethoxysilane, diethyl dimethoxysilane, vinyl triethoxysilane, vinyl trimethoxysilane, trimethyl methoxysilane, triethyl methoxysilane, vinyl tris (methoxyethoxy) silane, trimethyl chlorosilane, dimethyl dichlorosilane, divinyl dimethoxysilane, and chloropropyltrimethoxysilane; polymethylsiloxane, organohydrogen polysiloxane, and the like. Hydrophobic silica fine powder may be used by using these agents for the surface treatment. In particular, silazanes are preferred as the surface treatment agent.

The blending amount of the component (C) is 1 to 50 parts by mass, preferably 5 to 30 parts by mass relative to 100 parts by mass of organopolysiloxane of the component (A). If the blending amount is too small, the strength required for airbag cannot be obtained. If the blending amount is too large, viscosity of the composition becomes high, which leads to decreased fluidity, and the coating workability may be deteriorated.

The fine powder silica of the component (C) may be used alone, or two or more of them may be used in combination.

Component (D)

The catalyst for hydrosilylation reaction of the component (D) promotes an addition reaction between the alkenyl group bonded to a silicon atom contained in the composition and the hydrosilyl group contained in the composition. Mainly, it promotes the addition reaction between the alkenyl group bonded to a silicon atom in the component (A) and the hydrosilyl group in the component (B). The catalyst for hydrosilylation reaction is not particularly limited, and examples thereof include platinum group metals such as platinum, palladium, and rhodium; chloroplatinic acid; alcohol-modified chloroplatinic acid; a coordination compound of chloroplatinic acid with olefins, vinyl siloxane or an acetylene compound; platinum group metal compounds such as tetrakis(triphenylphosphine)palladium, and chlorotris(triphenylphosphine)rhodium. Preferred is a platinum group metal compound.

The blending amount of the component (D) may be an effective amount (catalytic amount) as a catalyst. It is preferably 1 to 500 ppm, more preferably 5 to 100 ppm relative to the total mass of the components (A) to (C) in terms of mass of catalytic metal element. When the blending amount is 1 ppm or more, the rate of addition reaction does not become very slow or failure of curing of the composition does not occur. When the blending amount is 500 ppm or less, the heat resistance of the cured product is not degraded.

The catalyst for hydrosilylation reaction of the component (D) may be used alone, or two or more of them may be used in combination.

Component (E)

The component (E) is an organosilicon compound containing an adhesion-imparting functional group. Examples of the adhesion-imparting functional group include an epoxy group, an alkoxy group bonded to a silicon atom (alkoxysilyl group), an alkenyl group, a hydrosilyl group, an isocyanate group, a (meth)acryl group, and a (meth)acryloxy group. The adhesion-imparting functional group is added for exhibiting and improving the adhesion of a silicone rubber composition to the base cloth for airbag.

Any organosilicon compound may be used provided that such an adhesion-imparting functional group is contained. Preferred is an organosilicon composition having one or more epoxy groups and alkoxy groups bonded to silicon atoms within one molecule. Moreover, in view of the adhesion-exhibiting property, an organosilicon compound having at least one epoxy group and at least one alkoxy group bonded to a silicon atom (for example, a trialkoxysilyl group, an organodialkoxysilyl group, and the like) such as an organosilane or a cyclic or linear organosiloxane having 1 to 100, preferably 1 to about 50 silicon atoms, and those having at least one epoxy group and at least two alkoxy groups bonded to silicon atoms are more preferred.

The epoxy group is not particularly limited, and preferred are those bonded to a silicon atom in the form of, for example, a glycidoxyalkyl group such as a glycidoxypropyl group; or an epoxy-containing cyclohexylalkyl group such as a 2,3-epoxycyclohexylethyl group and a 3,4-epoxycyclohexylethyl group.

The alkoxy group bonded to a silicon atom is not particularly limited, and is preferably bonded to a silicon atom to form, for example, a trialkoxysilyl group such as a trimethoxysilyl group and a triethoxysilyl group; and an alkyldialkoxysilyl group such as a methyldimethoxysilyl group, an ethyldimethoxysilyl group, a methyldiethoxysilyl group, and an ethyldiethoxysilyl group.

The component (E) may contain, within one molecule, as a functional group other than an epoxy group and alkoxy group bonded to a silicon atom, at least one functional group selected from the group consisting of an alkenyl group such as a vinyl group, a (meth)acryl group, a (meth)acryloxy group, an isocyanate group, and a hydrosilyl group.

Examples of the organosilicon compound of the component (E) include an epoxy group-containing silane coupling agent (that is, epoxy functional group-containing organoalkoxysilane) such as γ-glycidoxypropyltriethoxysilane, γ-glycidoxypropylmethyldiethoxysilane, (3,4-epoxycyclohexylethyl)trimethoxysilane, (3,4-epoxycyclohexylethyl) triethoxysilane, (3,4-epoxycyclohexylethyl)methyldimethoxysilane, (3,4-epoxycyclohexylethyl) methyldiethoxysilane, (2,3-epoxycyclohexylethyl) triethoxysilane, (2,3-epoxycyclohexylethyl) methyldimethoxysilane, and (2,3-epoxycyclohexylethyl) methyldiethoxysilane, a vinyl group-containing silane coupling agent such as vinyl trimethoxysilane, a (meth)acryl group-containing silane coupling agent such as 3-(meth) acryloxypropyl trimethoxysilane, an isocyanate group-containing silane coupling agent such as 3-isocyanate propyltriethoxysilane, a silane coupling agent such as a methoxysilyl modified product of triallyl isocyanurate, an organosilicon compound such as a cyclic organopolysiloxane or a linear organopolysiloxane represented by the following chemical formula, a mixture of two or more thereof, or a partially hydrolyzed condensate of one or two or more thereof.

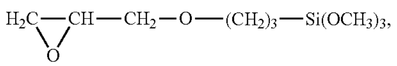

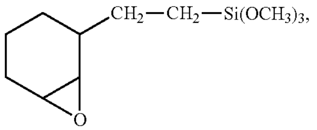

$H_2C{=}CH{-}Si(OCH_3)_3$,

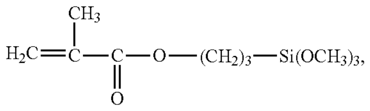

$O{=}C{=}N{-}(CH_2)_3{-}Si(OCH_2CH_3)_3$,

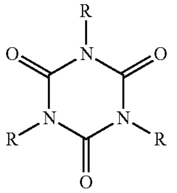

R = $-CH_2CH{=}CH_2$
or
$-CH_2CH_2CH_2Si(OCH_3)_3$,

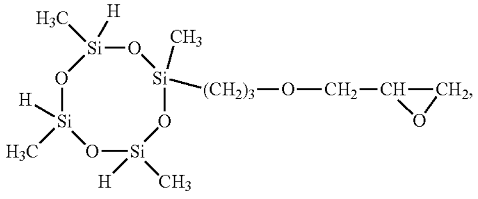

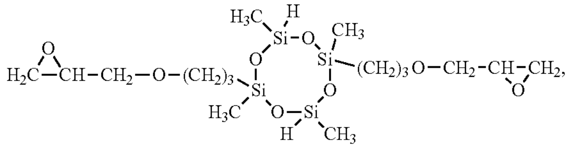

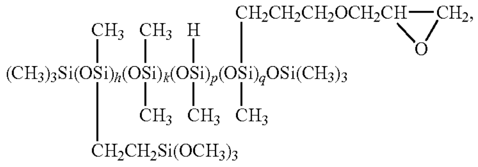

-continued

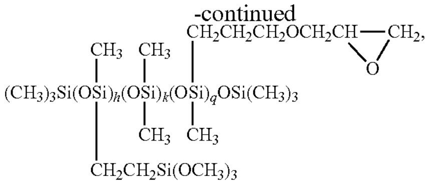

In the formula, one or more of R is $-CH_2CH_2CH_2Si(OCH_3)_3$, h is an integer of 1 to 10, k is an integer of 0 to 40, preferably an integer of 0 to 20, p is an integer of 1 to 40, preferably an integer of 1 to 20, and q is an integer of 1 to 10.

The blending amount of the component (E) is 0.1 to 10 parts by mass, preferably 0.25 to 5 parts by mass relative to 100 parts by mass of the organopolysiloxane of the component (A). If the blending amount is less than 0.1 parts by mass, the obtained composition may not exhibit sufficient adhesive strength. If the blending amount exceeds 10 parts by mass, the cost becomes high and it is uneconomical. Moreover, the viscosity and thixotropy are increased to result in deterioration of the coatability.

When the component (E) contains an alkenyl group and/or a hydrosilyl group, the hydrosilyl group contained in the composition is in the amount of 1 to 10 moles per 1 mole of the total alkenyl groups bonded to silicon atoms contained in the composition. For example, the total amount of hydrosilyl groups contained in the component (B) and the component (E) relative to 1 mole (or group) of the total alkenyl groups bonded to silicon atoms contained in the component (A) and the component (E) in the composition can be 1 to 10 moles (or groups), preferably 1.2 to 9 moles (or groups), and more preferably 1.5 to 8 moles (or groups). If the hydrosilyl group is less than 1 mole relative to 1 mole of the alkenyl groups bonded silicon atoms in the composition, the composition may not be sufficiently cured to fail to exhibit sufficient adhesive strength. On the other hand, if it exceeds 10 moles, the heat resistance of the obtained cured silicone rubber product may be extremely inferior.

The component (E) may be used alone, or two or more of them may be used in combination.

Component (F)

The component (F) is an organopolysiloxane resin having a three-dimensional network (resin-like) structure. Suitably, it is basically constituted of at least one branched siloxane unit selected from a trifunctional $R^3SiO_{3/2}$ unit and tetrafunctional $SiO_{4/2}$ unit, may optionally contain a monofunctional $R^3{}_3SiO_{1/2}$ unit and/or a bifunctional $R^3{}_2SiO_{2/2}$ unit as necessary, and acts as a flame retardancy improver. However, this organopolysiloxane resin may contain an alkenyl group, but does not contain a hydrogen atom bonded to a silicon atom (hydrosilyl group) in the molecule. Furthermore, this organopolysiloxane resin has a three-dimensional network (resin-like) structure and is powdery at 25° C., and thus is clearly differentiated from the component (A) which has basically a linear structure and is liquid at 25° C.

$R^3$ in the above formulas each represents the same or different, unsubstituted or substituted monovalent hydrocarbon group having 1 to 10, preferably 1 to 8 carbon atoms, and examples thereof include the same as those exemplified for the alkenyl group and monovalent organic group (unsubstituted or substituted monovalent hydrocarbon group) in the above component (A). Specifically, an alkenyl group such as a vinyl group, an allyl group, a propenyl group, a butenyl group, a pentenyl group, a hexenyl group, a cyclohexenyl group, and a heptenyl group; an alkyl group such as a methyl group, an ethyl group, a propyl group, a butyl group, a pentyl group, a hexyl group, a cyclohexyl group, and a heptyl group; an aryl group such as a phenyl group, a tolyl group, a xylyl group, and a naphthyl group; an aralkyl group such as a benzyl group and a phenethyl group; a halogen-substituted alkyl group such as a chloromethyl group, a 3-chloropropyl group, and a 3,3,3-trifluoropropyl group may be exemplified. In particular, a methyl group and a vinyl group are preferred.

The content of the alkenyl group bonded to a silicon atom in the component (F) is preferably 0 to 10 mole %, particularly preferably about 2 to 8 mole % relative to the total substituents bonded to a silicon atom.

The organopolysiloxane resin of the component (F) preferably contains an $R^3SiO_{3/2}$ unit and/or $SiO_{4/2}$ unit, and the total amount thereof is preferably 20 to 75 mole %, particularly preferably 30 to 60 mole % in the organopolysiloxane resin of the component (F).

Here, the organopolysiloxane resin of the component (F) may optionally contain an $R^3{}_3SiO_{1/2}$ unit and/or $R^3{}_2SiO_{2/2}$ unit as described above, and the total content thereof is preferably 0 to 70 mole %, and particularly preferably 0 to 50 mole % in the organopolysiloxane resin of the component (F).

It is suitable when the total amount of the $R^3SiO_{3/2}$ unit and/or $SiO_{4/2}$ unit is within a range of 20 to 75 mole %, since sufficient flame retardancy improvement effect can be obtained.

Further, the weight average molecular weight of the organopolysiloxane resin of the component (F) in terms of polystyrene in GPC (gel permeation chromatography) analysis using toluene as a developing solvent is preferably in a range of 2,000 to 50,000, and particularly preferably 4,000 to 20,000. When the weight average molecular weight is in the range of 2,000 to 50,000, sufficient flame retardancy improvement effect can be obtained, and a liquid silicone rubber coating composition with a viscosity that provides preferable coating workability is obtained. Note that the weight average molecular weight is a value determined by a GPC analysis under the same conditions as that used for obtaining the polymerization degree of the component (A).

Specific examples of the organopolysiloxane resin of the component (F) include an organosiloxane copolymer composed of a siloxane unit represented by the formula: $R'_3SiO_{1/2}$, a siloxane unit represented by the formula: $R'_2R''SiO_{1/2}$, a siloxane unit represented by the formula: $R'_2SiO_{2/2}$, and a siloxane unit represented by the formula: $SiO_{4/2}$; an organosiloxane copolymer composed of a siloxane unit represented by the formula: $R'_3SiO_{112}$, a siloxane unit represented by the formula: $R'_2R''SiO_{1/2}$, and a siloxane unit represented by the formula: $SiO_{4/2}$; an organosiloxane copolymer composed of a siloxane unit represented by the formula: $R'_2R''SiO_{1/2}$, a siloxane unit represented by the formula: $R'_2SiO_{2/2}$, and a siloxane unit represented by the formula: $SiO_{4/2}$; an organosiloxane copolymer composed of a siloxane unit represented by the formula: $R'R''SiO_{2/2}$, and a siloxane unit represented by the formula: $R'SiO_{3/2}$ or a siloxane unit represented by the formula: $R''SiO_{3/2}$; and a mixture composed of two or more of these organopolysiloxanes.

R' in the above formulas are each represents the same or different, unsubstituted or substituted monovalent hydrocarbon group having 1 to 10, preferably 1 to 8 carbon atoms other than the alkenyl group, and examples thereof include an alkyl group such as a methyl group, an ethyl group, a propyl group, a butyl group, a pentyl group, a hexyl group, a cyclohexyl group, and a heptyl group; an aryl group such as a phenyl group, a tolyl group, a xylyl group, and a naphthyl group; an aralkyl group such as a benzyl group and a phenethyl group; a halogenated alkyl group such as a chloromethyl group, a 3-chloropropyl group, and a 3,3,3-trifluoropropyl group. In particular, a methyl group is preferred. Further, R" in the above formulas is an alkenyl group, and examples thereof include a vinyl group, an allyl group, a butenyl group, a pentenyl group, a hexenyl group, and a heptenyl group. In particular, a vinyl group is preferred.

The blending amount of the component (F) is 0.1 to 100 parts by mass, preferably 1 to 95 parts by mass, and particularly preferably 2 to 90 parts by mass relative to 100 parts by mass of the organopolysiloxane of the component (A). If the blending amount is not in the range of 1 to 100 parts by mass, sufficient flame retardancy improvement effect cannot be obtained, and also the cost-effectiveness is inferior.

When the component (F) contains an alkenyl group, the amount thereof is such that the hydrosilyl groups contained in the composition is 1 to 10 moles per 1 mole of the total alkenyl groups bonded to silicon atoms contained in the composition. For example, the amount of the component (F) may be such that the hydrosilyl groups contained in the component (B) and the component (E) is 1 to 10 moles (or groups), preferably 1.2 to 9 moles (or groups), and more preferably 1.5 to 8 moles (or groups) per 1 mole of the total alkenyl groups bonded to silicon atoms contained in the component (A), the component (E), and the component (F) in the composition.

Additionally, when the component (A), the component (E), and the component (F) containing an alkenyl group and the like are used in combination, the ratio of the total number of moles of hydrosilyl groups relative to 1 mole of the total alkenyl groups in each component of the whole composition is taken into consideration, and the components are blended.

For example, when the silica fine powder of the component (C) is directly subjected to surface-hydrophobization treatment by a surface treatment agent containing an alkenyl group beforehand in a powder state, the component (F) contains an alkenyl group, and the component (E) contains an alkenyl group and/or a hydrosilyl group, an amount of the total hydrosilyl groups contained in the component (B) and the component (E) relative to 1 mole of the total alkenyl groups bonded to silicon atoms (or nitrogen atoms) contained in the component (A), component (C), component (E), and component (F) in the composition may be 1 to 10 moles, preferably 1.2 to 9 moles, and more preferably 1.5 to 8 moles.

This is because when the total hydrosilyl groups relative to 1 mole of the total alkenyl groups bonded to silicon atoms contained in the composition is less than 1 mole, the composition is not cured sufficiently, and sufficient adhesion strength may not be exhibited. On the other hand, when the amount of the hydrosilyl group exceeds 10 moles, the heat resistance of the obtained silicone rubber cured product may be extremely inferior, as described above.

In the present invention, as described above, each component is blended such that the total number of moles of the hydrosilyl groups relative to 1 mole of the total alkenyl groups in the components contained in the addition curable liquid silicone rubber composition for airbag is 1 to 10 moles.

The organopolysiloxane resin having a three-dimensional network structure of the component (F) may be used alone, or two or more of them may be used in combination.

Component (G)

The blending amount of the component (G), iron(III) oxide monohydrate and/or α-iron(III) oxide, is 1 to 50 parts by mass, preferably 1.1 to 40 parts by mass, more preferably 1.1 to less than 25 parts by mass, and further preferably 1.2 to 6.0 parts by mass relative to 100 parts by mass of the component (A). When the blending amount is within the above range, the obtained cured product has excellent flame retardancy. On the other hand, if the blending amount of the component (G) is less than 1 part by mass, the flame retardancy of the cured product is insufficient, and if the blending amount exceeds 50 parts by mass, the mechanical strength is possibly impaired. Further, each of iron(III) oxide monohydrate and α-iron(III) oxide may be used singly, or may be used in combination.

Further, the pH of the component (G) is 5 to 9, preferably 5.5 to 8.5 as measured by the extraction at normal temperature specified in JIS K 5101-17-2; 2004. If the pH is not in this range, the self-extinguishing property is inferior.

The particle size of the component (G) is not particularly limited as long as the above conditions are satisfied, and is preferably 0.01 to 10 μm, particularly preferably 0.05 to 5 μm in the BET average particle size. When the BET average particle size is 0.01 μm or more, the viscosity of the obtained silicone rubber composition is decreased so that the workability is not deteriorated, and when it is 10 μm or less, there is no risk that the mechanical strength of the obtained silicone rubber is impaired.

Examples of the component (G) include Toda Color TSY-1 (Toda Pigment Corp., pH 6.0), Toda Color TSY-2 (Toda Pigment Corp., pH 6.0), Toda Color 100ED (Toda Pigment Corp., pH 6.0), and Toda Color 130ED (Toda Pigment Corp., pH 6.0).

Other Component

Any other component can be blended to the composition according to the present invention as necessary other than the components (A) to (G). Specific examples thereof include the following. These other components can be used alone, or two or more of them may be used in combination.

Component (H)

The condensation cocatalyst of the component (H) is at least one selected from an organotitanium compound, an organozirconium compound, and an organoaluminum compound, and acts as a condensation cocatalyst of the adhesion-imparting functional group in the component (E) for promoting adhesion. Specific examples of the component (H) include a titanium based condensation cocatalyst (titanium compound) such as an organic titanic acid ester including titanium tetraisopropoxide, titanium tetra-n-butoxide, and titanium tetra-2-ethylhexoxide, and an organic titanium chelate compound including diisopropoxy bis (acetyl acetonate) titanium, diisopropoxy bis(ethyl acetoacetate) titanium, and titanium tetra-acetylacetonate; a zirconium based condensation cocatalyst (zirconium compound) such as organic zirconium ester including zirconium tetra-n-propoxide and zirconium tetra-n-butoxide, and an organic zirconium chelate compound including zirconium tributoxy monoacetylacetonate, zirconium monobutoxy acetylacetonate bis(ethyl acetoacetate), and zirconium tetraacetylacetonate; and aluminum based condensation cocatalyst (aluminum compound) such as organic aluminum acid ester including aluminum secondary butoxide, an organic aluminum chelate compound including aluminum tris acetyl acetonate, aluminum bis-ethylacetoacetate monoacetylacetonate, and aluminum tris-ethylacetoacetate.

The condensation cocatalyst of the component (H) is an optional component blended as necessary. The blending amount thereof is preferably 0.1 to 5 parts by mass, more preferably 0.2 to 4 parts by mass relative to 100 parts by mass of the component (A). When the blending amount is within the above range, the obtained cured product has excellent adhesion durability at high temperature and high humidity.

Reaction Controlling Agent

Any known reaction controlling agent may be used without limitation as long as it has an effect of inhibiting curing to the catalyst for hydrosilylation reaction of the component (D). Specific examples thereof include a phosphorus-containing compound such as triphenyl phosphine; a nitrogen-containing compound such as tributyl amine, tetramethyl ethylenediamine, and benzotriazole; a sulfur-containing compound; an acetylene-based compound such as acetylene alcohols; a compound containing two or more alkenyl groups; a hydroperoxy compound; a maleic acid derivative, and the like.

A degree of the curing inhibition effect by the reaction controlling agent varies depending on a chemical structure of the reaction controlling agent. Therefore, an addition amount of the reaction controlling agent is preferably adjusted to an optimum amount for each reaction controlling agent to be used. By adding an optimum amount of the reaction controlling agent, the composition has excellent long term storage stability at room temperature and curability.

Non-Reinforcing Filler

Examples of a non-reinforcing filler other than the silica fine powder of the component (C) include a filler such as crystalline silica (for example, quartz powder having a BET specific surface area of less than 50 $m^2/g$), an organic resin hollow filler, polymethyl silsesquioxane fine particles (so-called silicone resin powder), fumed titanium dioxide, magnesium oxide, zinc oxide, iron(II) oxide, aluminum hydroxide, magnesium carbonate, calcium carbonate, zinc carbonate, carbon black, diatomaceous earth, talc, kaolinite, and glass filler; and a filler obtained by subjecting these fillers to surface-hydrophobization treatment with an organosilicon compound such as an organoalkoxysilane compound, an organochlorosilane compound, an organosilazane compound, and a low-molecular weight siloxane compound.

Other Component

In addition, for example, an organopolysiloxane containing one hydrogen atom bonded to a silicon atom within one molecule and no other functional group, an organopolysiloxane containing one alkenyl group bonded to a silicon atom within one molecule and no other functional group, a non-functional organopolysiloxane containing no hydrogen atom bonded to a silicon atom, no alkenyl group bonded to a silicon atom, or no other functional group (so-called dimethyl silicone oil), an organic solvent, anti-creep hardening agent, plasticizer, thixotropic agent, pigment, dye, and fungicide may be blended.

Preparation of Addition Curable Liquid Silicone Rubber Composition

The addition curable liquid silicone rubber composition can be prepared by uniformly mixing the above components (A) to (G), and other component such as the component (H) optionally blended as necessary. For example, the addition curable liquid silicone rubber composition can be prepared by uniformly mixing (all or a part of) the component (A), the component (C), and other component blended as necessary to prepare a base compound, and further blending (residual of) the component (A), the components (B), (D), (E), (F), (G), and the component (H) as necessary, and uniformly mixing the obtained mixture. Mixing of the raw materials for preparing the addition curable liquid silicone rubber composition for airbag according to the present invention can be carried out using any known method and apparatus for producing an addition curable liquid silicone rubber composition. Examples of the apparatus that can be used include a known kneading apparatus such as a two-roll mixer, three-roll mixer, kneader mixer, planetary mixer, and Ross mixer.

The thus obtained addition curable liquid silicone rubber composition for airbag is a composition which is liquid at 25° C., preferably has a viscosity of 1 to 1,000 Pa·s, more preferably 5 to 300 Pa·s at 25° C. as measured using a B type rotary viscometer by the method described in JIS K 7117-1:1999. Within this range of viscosity, when the composition is coated onto a base cloth for airbag, the coating unevenness or insufficiency of adhesion strength to the base cloth after curing hardly occurs, and thus can be suitably used.

Base Cloth for Airbag

As the base cloth for airbag (base material made of fiber cloth) on which a silicone rubber layer composed of a cured product of the above addition curable liquid silicone rubber composition is formed, a known one may be used. Specific examples thereof include a woven fabric of various synthetic fibers such as various polyester fibers including polyethylene terephthalate (PET) and polybutylene terephthalate (PBT), and various polyamide fibers including 6,6-nylon and 6-nylon.

Method for Producing Airbag

The addition curable liquid silicone rubber composition is coated onto at least one surface, particularly one surface of the base cloth for airbag (base material made of fiber cloth), and then by heating and curing the composition in a dry furnace or the like, a silicone rubber layer (cured film) can be formed. By using the thus obtained silicone rubber coated base cloth for airbag, an airbag can be produced.

Here, a conventional method can be employed as the method for coating the addition curable liquid silicone rubber composition onto the base cloth for airbag, and coating by a knife coater is preferred. The thickness of the coating layer (or surface coating amount) is preferably 5 to 100 $g/m^2$ in general, and more preferably 8 to 90 $g/m^2$, and may be further preferably 10 to 80 $g/m^2$.

The addition curable liquid silicone rubber composition can be cured by a known curing method under known curing conditions, and thereby a cured film of the above composition can be obtained. Specifically, for example, the composition can be cured by heating at 100 to 200° C. for 1 to 30 minutes.

For processing the thus produced base cloth for airbag (silicone rubber-coated base cloth for airbag) having a silicone rubber layer (cured film) on at least one surface into an airbag, a method of bonding peripheral parts of two plain woven cloths each other with an adhesive, and sewing the adhesive layers together can be used; in the two plain woven cloths, at least the inner side of an airbag is coated with silicone rubber. Alternatively, a method of coating the addition curable liquid silicone rubber composition to both outer sides of a hollow woven base cloth for airbag made in advance in a predetermined coating amount, and curing the composition under predetermined curing conditions, can be employed. A known adhesive may be used as the adhesive used at this time, and a silicone-based adhesive which is called seam sealant is suitable in terms of adhesive strength, adhesion durability, and the like.

Example

Hereinafter, the present invention will be specifically described by showing Preparation Example, Examples, and Comparative Examples. However, the present invention is not limited to the following Examples. Note that the viscosity is a value measured at 25° C. using the rotary viscometer as described in JIS K 7117-1:1999. The polymerization degree and weight average molecular weight were measured as described above. The BET average particle diameter is a value measured by the BET method.

Preparation Example 1

60 parts by mass of dimethylpolysiloxane (A1) with both molecular ends blocked with vinyl dimethyl siloxy groups having the viscosity of 30,000 mPa·s at 25° C. and polymerization degree of 750, 8 parts by mass of hexamethyl disilazane, 2 parts by mass of water, and 40 parts by mass of silica fine powder (C) (Aerosil 300, product of Nippon Aerosil Co., Ltd.) having the specific surface area of 300 $m^2/g$ in BET method were placed in a kneader, and mixed at room temperature for 1 hour. Then, the temperature was raised to 150° C., and the mixture was subsequently mixed for 2 hours. Thereafter, the temperature was lowered to room temperature, 25 parts by mass of dimethylpolysiloxane (A1) with both molecular ends blocked with vinyl dimethyl siloxy groups having the viscosity of 30,000 mPa·s at 25° C. and polymerization degree of 750, and 5 parts by mass of dimethyl-vinylmethyl polysiloxane (A2) with both molecular ends blocked with trimethyl siloxy groups having the viscosity of 700 mPa·s at 25° C. and polymerization degree of 200 and containing 5 mole % of vinyl methyl siloxane unit and 95 mole % of dimethyl siloxane unit in bifunctional diorganosiloxane units constituting the main chain were added. The mixture was mixed until uniform to obtain a base compound (1) (Table 1).

TABLE 1

| | Base compound (1) |
|---|---|
| A1 | 85 |
| A2 | 5 |
| C | 40 |
| Hexamethyldisilazane | 8 |
| Water | 2 |

Example 1

To 150 parts by mass of the base compound (1) obtained in Preparation Example 1, 10 parts by mass of dimethyl polysiloxane (A3) with both molecular ends blocked with vinyl dimethyl siloxy groups having the viscosity of 5,000 mPa·s and polymerization degree of 450, 60.5 parts by mass of dimethyl polysiloxane (A4) with both molecular ends blocked with vinyl dimethyl siloxy groups having the viscosity of 1,000 mPa·s and polymerization degree of 200, 52.8 parts by mass of dimethyl polysiloxane (A5) with both molecular ends blocked with vinyl dimethyl siloxy groups having the viscosity of about 400 mPa·s and polymerization degree of 160, 14 parts by mass of a dimethyl siloxane/methylhydrogen siloxane copolymer (B) with both molecular ends blocked with trimethyl siloxy groups having the viscosity of 45 mPa·s at 25° C. and a silicon atom-bonded hydrogen atom at the molecular side chain (content of the silicon atom-bonded hydrogen atom=0.0108 mol/g) as a crosslinking agent, 0.56 parts by mass of γ-glycidoxy propyl trimethoxysilane (E), 0.09 parts by mass of 1-ethynyl cyclohexanol, 0.45 parts by mass of a dimethyl polysiloxane solution (D) containing 1% by mass of chloroplatinic acid/

1,3-divinyl tetramethyl disiloxane complex as the platinum atom content, 10 parts by mass of an organopolysiloxane resin (F) having a three-dimensional network structure composed of 39.5 mole % of $(CH_3)_3SiO_{1/2}$ unit, 6.5 mole % of $(CH_3)_2(CH_2{=}CH)SiO_{1/2}$ unit, and 54 mole % of $SiO_{4/2}$ unit (weight average molecular weight: 6,000), 0.34 parts by mass of tetraoctyl titanium (H), and 2.83 parts by mass of $Fe_2O_3$ (G1) (α-iron(III) oxide): Toda Color 130ED: Toda Pigment Corp., BET average particle size 0.16 μm, pH 6.0) were mixed for 1 hour to prepare a composition A (hydrosilyl group/vinyl group (hereinafter, H/Vi, molar ratio)=4.6, viscosity 51 Pa·s).

Burning Rate Test Method

The composition A was coated onto a PET base cloth for airbag (470 dtex) in a coating amount of 20 to 25 g/m², and cured at 190° C./minute in a dryer to obtain a coated base cloth, and the flame retardancy was evaluated in the method specified in FMVSS No. 302. The base cloth (10 cm width×35 cm length), a test piece, was placed with the silicone rubber-coated surface upside, the burning distance and burning time were measured when the cloth was burnt by the method described in FMVSS No. 302 until the flame disappeared. From this burning distance and burning time, the burning rate was calculated. At that time, either one of (1) the test piece which was not ignited or self-extinguished (SE) before the reference line A, (2) the test piece which was self-extinguished (SE) within the burning distance of 51 mm (as well as within 60 seconds), or (3) the test piece having the burning rate of 102 mm/min or less, was evaluated as passing the flame retardancy. However, if there was even one test piece which was completely burnt down, it was rated as failure in the flame retardancy. The measurement was performed at N=10, and the average value was determined as the evaluation result. The results are shown in Table 2. Further, the self-extinction rate (SE rate) was determined by the following formula, and the results are shown in Table 2. When the SE rate is higher, the flame retardancy is considered to be better.

SE rate (%)=((1) the number of test pieces which were not ignited or self-extinguished before the reference line $A$+(2) the number of test pieces which were self-extinguished within the burning distance of 51 mm (as well as within 60 seconds)/10×100

Example 2

The burning rate test was performed as in Example 1 by preparing a composition B (H/Vi=4.6, viscosity 52 Pa·s) except that the amount of dimethyl polysiloxane (A5) with both molecular ends blocked with vinyl dimethyl siloxy groups having the viscosity of about 400 mPa·s and polymerization degree of 160, and $Fe_2O_3$(G1) of Example 1 was increased to 55.7 parts by mass and 5.65 parts by mass, respectively. The results are shown in Table 2.

Example 3

The burning rate test was performed as in Example 1 by preparing a composition C (H/Vi=4.6, viscosity 54 Pa·s) except that the amount of dimethyl polysiloxane (A5) with both molecular ends blocked with vinyl dimethyl siloxy groups having the viscosity of about 400 mPa·s and polymerization degree of 160, and $Fe_2O_3$(G1) of Example 1 was increased to 61.3 parts by mass and 11.3 parts by mass, respectively. The results are shown in Table 2.

Example 4

The burning rate test was performed as in Example 1 by preparing a composition D (H/Vi=4.6, viscosity 52 Pa·s) except that $Fe_2O_3$(G1) of Example 1 was replaced with 2.83 parts by mass of $Fe_2O_3{\cdot}H_2O$ (G2) (iron(III) oxide monohydrate: Toda Color TSY-1: Toda Pigment Corp., pH 6.0). The results are shown in Table 2.

Example 5

The burning rate test was performed as in Example 1 by preparing a composition E (H/Vi=4.6, viscosity 54 Pa·s) except that $Fe_2O_3$(G1) of Example 1 was replaced with 5.65 parts by mass of $Fe_2O_3{\cdot}H_2O$ (G2) (iron(III) oxide monohydrate: Toda Color TSY-1: Toda Pigment Corp., pH 6.0). The results are shown in Table 2.

Example 6

The burning rate test was performed as in Example 1 by preparing a composition F (H/Vi=4.6, viscosity 56 Pa·s) except that $Fe_2O_3$(G1) of Example 1 was replaced with 11.3 parts by mass of $Fe_2CO{-}H_2O$ (G2) (iron(III) oxide monohydrate: Toda Color TSY-1: Toda Pigment Corp., pH 6.0). The results are shown in Table 2.

Example 7

The burning rate test was performed as in Example 1 by preparing a composition G (H/Vi=4.6, viscosity 51 Pa·s) except that the amount of $Fe_2O_3$(G1) of Example 1 was decreased to 1.42 parts by mass and 1.42 parts by mass of $Fe_2O_3{\cdot}H_2O$ (G2) was added. The results are shown in Table 2.

Comparative Example 1

The burning rate test was performed as in Example 1 by preparing a composition H (H/Vi=4.6, viscosity 48 Pa·s) except that the amount of dimethyl polysiloxane (A5) with both molecular ends blocked with vinyl dimethyl siloxy groups having the viscosity of about 400 mPa·s and polymerization degree of 160, and $Fe_2O_3$(G1) of Example 1 was decreased to 51.7 parts by mass and 1.70 parts by mass, respectively. The results are shown in Table 2.

Comparative Example 2

The burning rate test was performed as in Example 1 by preparing a composition I (H/Vi=4.6, viscosity 46 Pa·s) except that the dimethyl polysiloxane (A5) with both molecular ends blocked with vinyl dimethyl siloxy groups having the viscosity of about 400 mPa·s and polymerization degree of 160, and $Fe_2O_3$(G1) of Example 1 were not blended. The results are shown in Table 2.

Comparative Example 3

The burning rate test was performed as in Example 1 by preparing a composition J (H/Vi=4.6, viscosity 52 Pa·s) except that $Fe_2O_3$(G1) of Example 1 was replaced with 2.33 parts by mass of $Fe_3O_4$ (Toda Color KN-320: Toda Pigment Corp., BET average particle size 0.27 μm, pH 9.5). The results are shown in Table 2.

Comparative Example 4

The burning rate test was performed as in Example 1 by preparing a composition K (H/Vi=4.6, viscosity 54 Pa·s) except that the amount of dimethyl polysiloxane (A3) with both molecular ends blocked with vinyl dimethyl siloxy groups having the viscosity of 5,000 mPa·s and polymerization degree of 450 of Example 1 was increased to 20 parts by mass, and $Fe_2O_3$(G1) was replaced with 10 parts by mass of $TiO_2$. The results are shown in Table 2.

Comparative Example 5

The burning rate test was performed as in Example 1 by preparing a composition L (H/Vi=4.6, viscosity 52 Pa·s) except that $Fe_2O_3$(G1) of Example 1 was replaced with 2.83 parts by mass of $Fe_2O_3·H_2O$ (Toda Color TSY-4: Toda Pigment Corp., pH 4.5). The results are shown in Table 2.

In Examples 1 to 7 and Comparative Examples 1 to 5, the blending amount of the used components is shown in Table 2. Note that the blending amounts in Table are converted value based on 100 parts by mass of the component (A). The amount of the component (D) is a value of the catalytic metal element in terms of mass relative to the total mass of the components (A) to (C).

TABLE 2

| Blending amount (parts by mass) | Ex. 1 | Ex. 2 | Ex. 3 | Ex. 4 | Ex. 5 | Ex. 5 | Ex. 7 | Comp. Ex. 1 | Comp. Ex. 2 | Comp. Ex. 3 | Comp. Ex . 4 | Comp. Ex. 5 |
|---|---|---|---|---|---|---|---|---|---|---|---|---|
| A | 100 | 100 | 100 | 100 | 100 | 100 | 100 | 100 | 100 | 100 | 100 | 100 |
| B | 6.37 | 6.29 | 6.13 | 6.37 | 6.29 | 6.37 | 6.37 | 6.40 | 6.37 | 6.37 | 6.37 | 6.37 |
| C | 19.5 | 19.3 | 18.8 | 19.5 | 19.3 | 19.5 | 19.5 | 19.6 | 19.5 | 19.5 | 19.5 | 19.5 |
| D (ppm) | 16 | 16 | 15 | 16 | 16 | 15 | 16 | 16 | 16 | 16 | 15 | 16 |
| E | 0.25 | 0.25 | 0.25 | 0.25 | 0.25 | 0.25 | 0.25 | 0.26 | 0.25 | 0.25 | 0.25 | 0.25 |
| F | 4.55 | 4.49 | 4.38 | 4.55 | 4.49 | 4.55 | 4.55 | 4.57 | 4.55 | 4.55 | 4.55 | 4.55 |
| G1 | | | | | | | 0.65 | 0.78 | | | | |
| G2 | | | | 1.29 | 2.54 | 4.95 | 0.65 | | | | | |
| $Fe_3O_4$ | | | | | | | | | | 1.06 | | |
| $TiO_2$ | | | | | | | | | | | 4.55 | |
| $Fe_2O_3/H_2O$ pH 4.5 | | | | | | | | | | | | 1.29 |
| H | 0.15 | 0.15 | 0.15 | 0.15 | 0.15 | 0.15 | 0.15 | 0.16 | 0.15 | 0.15 | 0.15 | 0.15 |
| H/Vi | 4.6 | 4.6 | 4.6 | 4.6 | 4.6 | 4.6 | 4.6 | 4.6 | 4.6 | 4.6 | 4.6 | 4.6 |
| Composition | A | B | C | D | E | F | G | H | I | J | K | L |
| Viscosity (Pa · s) | 51 | 52 | 52 | 54 | 54 | 56 | 51 | 48 | 46 | 52 | 54 | 52 |
| Flame retardancy | Pass | Pass | Pass | Pass | Pass | Pass | Pass | Pass | Failure | Failure | Failure | Pass |
| SE rate (%) | 100 | 100 | 100 | 100 | 100 | 100 | 100 | 20 | 20 | 20 | 0 | 20 |
| (1) SE before reaching reference line (%) | 0 | 0 | 0 | 0 | 25 | 75 | 0 | 0 | 0 | 0 | 0 | 0 |
| (2) SE within burning distance of 51 mm and 60 seconds (%) | 100 | 100 | 100 | 100 | 75 | 25 | 100 | 20 | 20 | 20 | 0 | 20 |
| (3) Burning rate of 102 mm/min or less (%) | 0 | 0 | 0 | 0 | 0 | 0 | 0 | 80 | 60 | 50 | 20 | 80 |
| Test piece was burnt down (%) | 0 | 0 | 0 | 0 | 0 | 0 | 0 | 0 | 20 | 30 | 80 | 0 |

As described above, the addition curable liquid silicone rubber composition for airbag of the present invention has excellent low burning rate property (flame retardancy) and self-extinguishing property (SE rate) as specified in FMVSS No. 302 as in Examples 1 to 7. On the other hand, Comparative Examples 1 and 2 containing a small amount or no component (G) passed the low burning rate property, but had low SE rate. Additionally, Comparative Examples 3 and 4 replaced with $Fe_3O_4$ or $TiO_2$ were both inferior in the low burning rate property and self-extinction rate. Further, Comparative Example 5 replaced with $Fe_2O_3 \cdot H_2O$ having pH of 4.5 passed the low burning rate property, but had low SE rate.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. An addition curable liquid silicone rubber composition for airbag comprising:

(A) 100 parts by mass of an organopolysiloxane which is liquid at 25° C. and contains two or more alkenyl groups bonded to silicon atoms within one molecule, (B) an organohydrogenpolysiloxane containing two or more hydrogen atoms bonded to silicon atoms within one molecule in such an amount that a hydrosilyl group contained in a composition is 1 to 10 moles per 1 mole of the total alkenyl groups bonded to silicon atoms contained in the composition, (C) 1 to 50 parts by mass of a silica fine powder having a BET specific surface area of 50 $m^2/g$ or more, (D) a catalytic amount of a catalyst for hydrosilylation reaction, (E) 0.1 to 10 parts by mass of an organosilicon compound containing an adhesion-imparting functional group, (F) 0.1 to 100 parts by mass of an organopolysiloxane resin having a three-dimensional network structure, and (G) 1.2 to 6.0 parts by mass of iron (III) oxide monohydrate or a combination of iron (III) oxide monohydrate and $\alpha$-iron (III) oxide, having a pH of 5 to 9, wherein the adhesion-imparting functional group of the component (E) is one or more groups selected from the group consisting of an epoxy group, an alkoxy group bonded to a silicon atom, an alkenyl group, a hydrosilyl group, an isocyanate group, a (meth)acryl group, and a (meth)acryloxy group.

2. The addition curable liquid silicone rubber composition for airbag according to claim 1, further comprising, as a component (H), 0.1 to 5 parts by mass of at least one condensation cocatalyst selected from an organotitanium compound, an organozirconium compound, and an organoaluminum compound relative to 100 parts by mass of the component (A).

3. An airbag comprising a cured film of the addition curable liquid silicone rubber composition for airbag according to claim 1, on a base cloth for airbag.

4. An airbag comprising a cured film of the addition curable liquid silicone rubber composition for airbag according to claim 2, on a base cloth for airbag.

* * * * *